United States Patent
Baker et al.

(10) Patent No.: US 10,308,396 B2
(45) Date of Patent: Jun. 4, 2019

(54) METHOD OF PRODUCING A PACKAGING CONTAINER WITH A CLOSURE AND RELEASE MECHANISM

(71) Applicants: Jay Baker, Mayville, NY (US); Jessup Baker, Brocton, NY (US)

(72) Inventors: Jay Baker, Mayville, NY (US); Jessup Baker, Brocton, NY (US)

( * ) Notice: Subject to any disclaimer, the term of this patent is extended or adjusted under 35 U.S.C. 154(b) by 0 days.

(21) Appl. No.: 15/943,405

(22) Filed: Apr. 2, 2018

(65) Prior Publication Data
US 2018/0222633 A1    Aug. 9, 2018

Related U.S. Application Data

(63) Continuation-in-part of application No. 15/484,074, filed on Apr. 10, 2017, now Pat. No. 9,932,156, and a continuation-in-part of application No. 15/447,463, filed on Mar. 2, 2017, now Pat. No. 9,932,154, which is a continuation-in-part of application No. 14/693,293, filed on Apr. 22, 2015, now Pat. No. 9,617,036, which is a continuation-in-part of application No. 14/693,270, filed on Apr. 22, 2015, (Continued)

(51) Int. Cl.
| | |
|---|---|
| *B29C 51/08* | (2006.01) |
| *B65D 25/10* | (2006.01) |
| *B65D 1/34* | (2006.01) |
| *B65D 43/16* | (2006.01) |

(52) U.S. Cl.
CPC .............. *B65D 25/10* (2013.01); *B65D 1/34* (2013.01); *B65D 43/162* (2013.01); *B65D 2543/00194* (2013.01); *B65D 2543/00296* (2013.01); *B65D 2543/00537* (2013.01); *B65D 2543/00666* (2013.01); *B65D 2543/00703* (2013.01); *B65D 2543/00731* (2013.01); *B65D 2543/00814* (2013.01); *B65D 2585/6885* (2013.01)

(58) Field of Classification Search
None
See application file for complete search history.

(56) References Cited

U.S. PATENT DOCUMENTS 2,687,157 A  *  8/1954  Cowan .................... B29C 33/30
                                                    16/385
3,215,327 A  *  11/1965  Crabtree .............. B65D 85/324
                                                    206/521.1
(Continued)

FOREIGN PATENT DOCUMENTS

JP              05050497          *   3/1993

*Primary Examiner* — Edmund H Lee
(74) *Attorney, Agent, or Firm* — The Bilicki Law Firm, P.C.; Rebecca M.K. Tapscott

(57) ABSTRACT

An apparatus and method for manufacturing a container with a closure-release mechanism. The process in particular relates to thermoforming a plastic sheet to form a container with a clam shell locking system in order to facilitate a secure closure and easy opening packaging container. The clam shell locking arrangement comprises a post which is secured in an aperture when the container is in closed state. The post is a projection or protrusion in a vertical or nearly vertical sidewall of the cover of the thermoformed package and fits securely into the aperture, which is a cut-out made in the outer, and optionally also the inner, wall segments of the vertical or nearly vertical surfaces of the base section of the thermoplastic containers.

8 Claims, 4 Drawing Sheets

Related U.S. Application Data now Pat. No. 9,617,039, which is a continuation of application No. 13/844,669, filed on Mar. 15, 2013, now Pat. No. 9,045,256.

(56) References Cited

U.S. PATENT DOCUMENTS

| | | | | |
|---|---|---|---|---|
| 3,317,955 A | * | 5/1967 | Confer | B29C 49/0073 |
| | | | | 264/524 |
| 3,640,668 A | * | 2/1972 | Brown, Jr. | B29C 51/082 |
| | | | | 264/321 |
| 3,669,606 A | * | 6/1972 | Brown | B29C 51/34 |
| | | | | 425/346 |
| 3,923,948 A | * | 12/1975 | Jackson | B29C 51/42 |
| | | | | 264/153 |
| 4,108,941 A | * | 8/1978 | Kermoian | B29C 51/082 |
| | | | | 264/153 |
| 4,142,848 A | * | 3/1979 | Irwin | B29C 51/32 |
| | | | | 425/291 |
| 4,143,111 A | * | 3/1979 | Irwin | B65D 85/324 |
| | | | | 206/521.1 |
| 4,446,088 A | * | 5/1984 | Daines | B29C 51/32 |
| | | | | 264/155 |
| 4,463,894 A | * | 8/1984 | Daines | B65D 85/324 |
| | | | | 206/521.1 |
| 4,612,153 A | * | 9/1986 | Mangla | B26F 1/00 |
| | | | | 264/154 |
| 5,085,571 A | * | 2/1992 | Congleton | B29C 51/32 |
| | | | | 264/154 |

\* cited by examiner

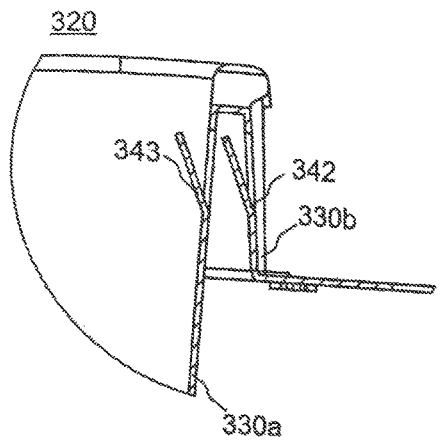
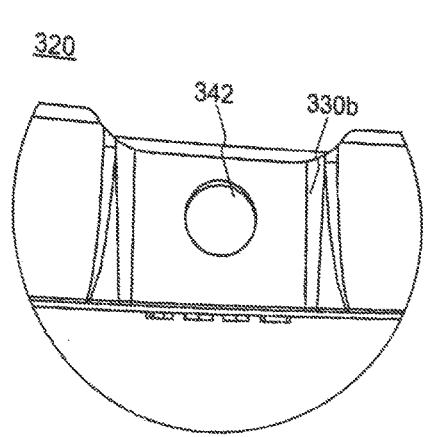
FIG. 3B  FIG. 3C
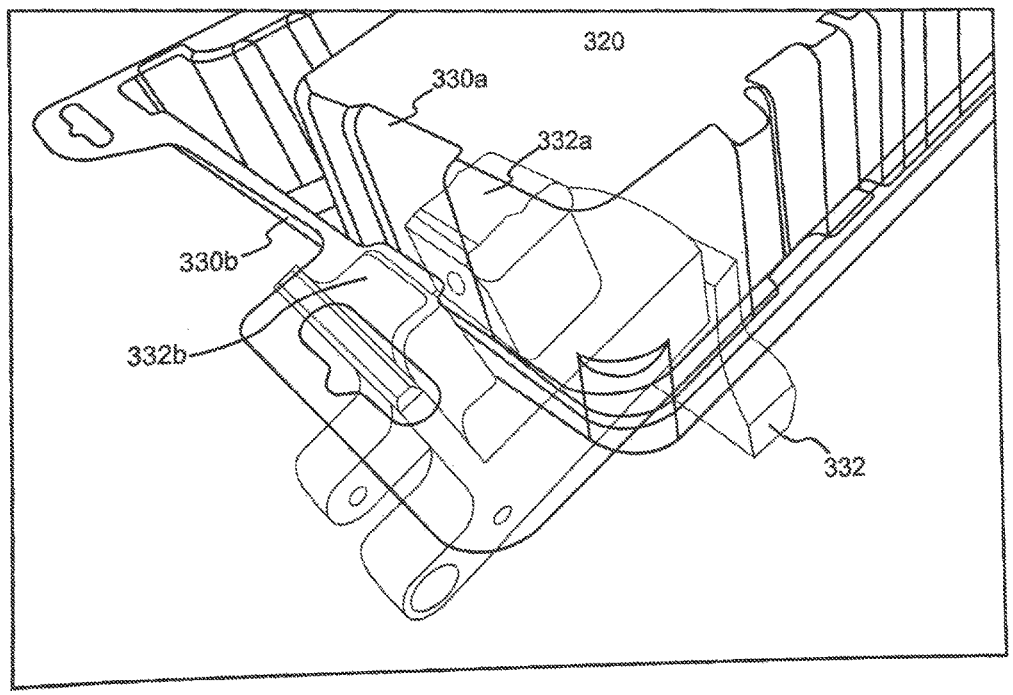
FIG. 3D

METHOD OF PRODUCING A PACKAGING CONTAINER WITH A CLOSURE AND RELEASE MECHANISM

CROSS-REFERENCE TO RELATED APPLICATION

This application is a continuation-in-part of and claims priority to U.S. patent application Ser. No. 15/447,463, filed Mar. 2, 2017, now U.S. Pat. No. 9,932,154, which is a continuation-in-part of U.S. patent application Ser. No. 14/693,293, filed Apr. 22, 2015, now U.S. Pat. No. 9,617,036, the entire contents of which are incorporated by reference herein.

This application is a continuation-in-part of and claims priority to U.S. patent application Ser. No. 15/484,074, filed Apr. 10, 2017, now U.S. Pat. No. 9,932,156, which is a continuation-in-part of U.S. patent application Ser. No. 14/693,270, filed Apr. 22, 2015, now U.S. Pat. No. 9,617,039, which is a continuation of U.S. patent application Ser. No. 13/844,669, filed Mar. 15, 2013, now U.S. Pat. No. 9,045,256, the entire contents of which are incorporated by reference herein.

TECHNICAL FIELD

The present disclosure relates to an apparatus and method of manufacturing a packaging container, more specifically, to clamshell-type packaging containers.

SUMMARY

The disclosure relates to a process for manufacturing a container with a closure-release mechanism. The process in particular relates to thermoforming a plastic sheet to form a container with a clam shell locking system in order to facilitate a secure closure and easy opening for a packaging container. The container according to the present disclosure comprises a base section which is pivotally attached to a cover section via a hinged portion. The elements of the clam shell locking arrangement are placed on both the base and the cover sections of the packaging container respectively to form a secure lock arrangement (in closed configuration).

A process of manufacturing the packaging container involves heating, forming, punching, trimming and stacking stages. Heating involves raising the temperature of the thermoplastic sheet so that it may be drawn into the desired shape during molding. This heated sheet is rolled over the mold which is selected according to the shape of the container. The mold according to the present disclosure has a two-sided arrangement with a portion for a base section having a peripheral wall defining a chamber along with pre-defined depressions and protrusions to hold the packaging material, and another portion specifically designed for the cover section having a side wall portion defining a cover, with a hinged formation between these portions.

After the molding process the container is removed from the mold and moved to the punching stage, whereupon portions of the locking system are created on the respective base and cover counterparts by utilizing a punch and die mechanism. The process further involves a trimming process, wherein the removal of unused portions of the thermoplastic sheet outside of the molded containers takes place. This is followed by the final process of stacking the newly formed containers together for further packaging.

The clam shell locking arrangement according to the present disclosure includes a post which is secured in an aperture when the container is in a closed state. The post is a projection or protrusion in a vertical or nearly vertical sidewall of the cover of the thermoformed package and fits securely into the aperture, which is a cut-out made in the inner and outer wall segments of the vertical or nearly vertical surfaces of the base section of the containers. The post and aperture may be produced using a punch and die mechanism. The punch tool is mounted and activated in a way that allows the location, timing, and force of the punch to be controlled precisely.

In particular, a method for thermoforming a packaging container is provided. The packaging container includes a closure and release mechanism having an inner aperture formed within the inner wall segment of a base section, and an outer aperture formed within an outer wall segment of the base section and aligned with the inner aperture; and, a projection extending inwardly from the side wall portion of the cover section for engaging at least the outer aperture the base section. The closure and release mechanism retains the cover section over the base section and secures the packaging container in a closed position. The projection is released from the outer aperture by depressing the deformable flange and applying inward force to the outer wall segment of the base section, thereby opening the packaging container.

The method includes: A. heating a sheet of thermoplastic material in a heating tunnel until the sheet becomes flexible; B. transferring the sheet to a mold having: a pre-formed shape of a base section with an upstanding wall with at least one indention on a side wall thereof, shaped to form a base section having a bottom surface and spaced apart inner and outer wall segments, the outer wall segment having a depression formed therein; a pre-formed shape of a cover section with a raised surface surrounded by a circumferential groove, the pre-formed shape of the cover section including a convex portion shaped to form an inwardly protruding section in a cover section of the packaging container; and a channel positioned between the base section and the cover section for forming a hinge joint of the packaging container; C. forming a post in the base section of the packaging container by C1. actuating a pin assembly including a spring and a pin, wherein an inlet of pressurized air compresses the spring to move the pin out of the pin assembly to an extended position to form the post, and the release of pressurized air causes the spring to return and retract the pin into the pin assembly; C2. cooling the sheet until it is rigid enough to be removed from the mold without losing the shape of the mold; C3. retracting the pin into the pin assembly and removing the shaped sheet from the mold; and D. positioning the shaped sheet to a punching station and actuating a lever arm to drive a punch to create an aperture in the side wall of the container.

BRIEF DESCRIPTION OF THE DRAWINGS

FIG. 3B is a perspective view of an aperture, according to an embodiment of the present disclosure;

FIG. 3C is a front view of an aperture, according to an embodiment of the present disclosure; and FIG. 3D is a perspective view of side walls of base section arranged in the die of the punching station, according to an embodiment of the present disclosure.

DETAILED DESCRIPTION

From the following detailed description of certain embodiments and examples, it will be apparent that various modifications, additions and other alternative embodiments and examples are possible without departing from the true scope and spirit of the disclosure. Also, it is to be understood that the phraseology and terminology used herein is for the purpose of description and should not be regarded as limiting.

Figure 1A:
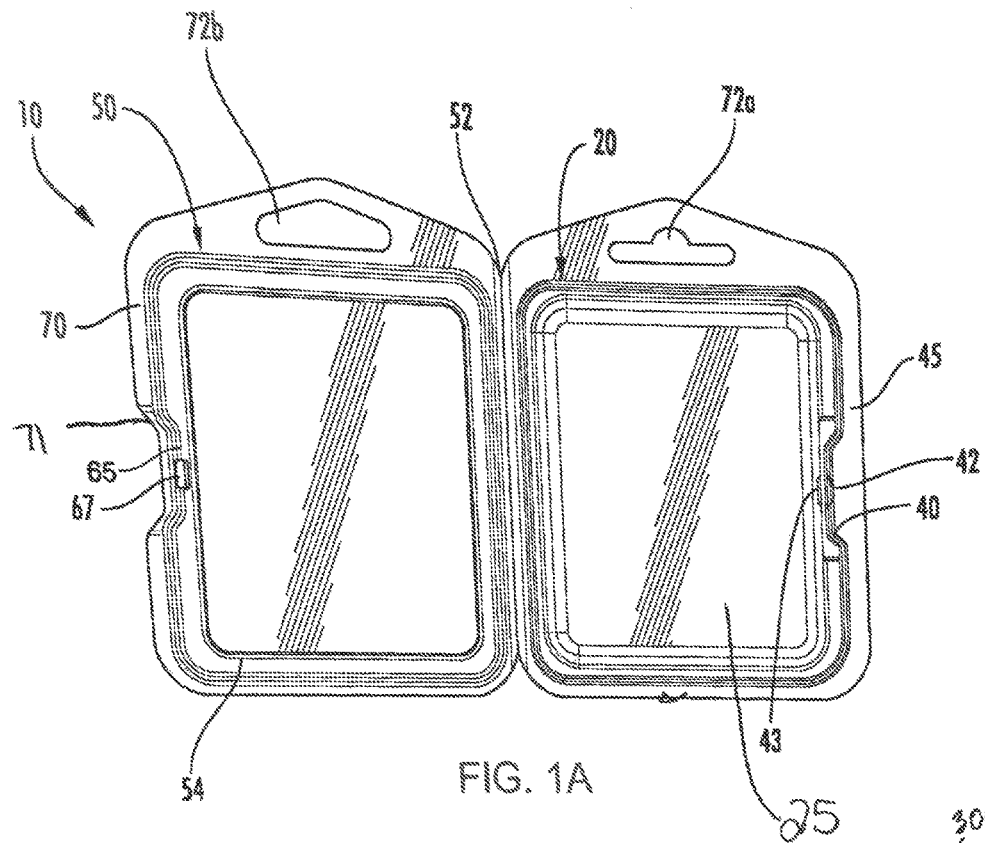
FIG. 1A is a front view of a packaging container according to one embodiment of the present disclosure, in which the packaging container is in an open configuration.
Figure 1B:
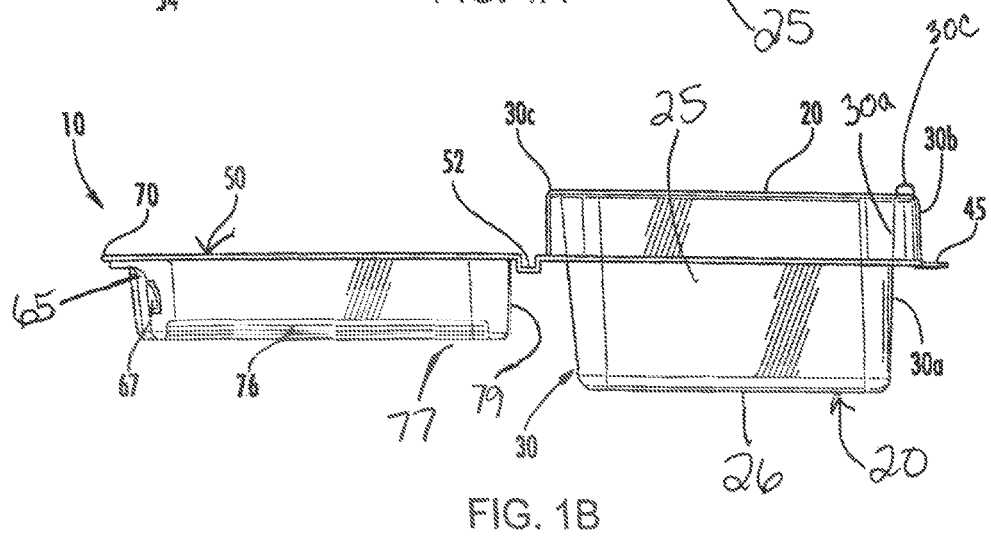
FIG. 1B is an end view of the packaging container, in which the packaging container is in an open configuration.
Figure 1C:
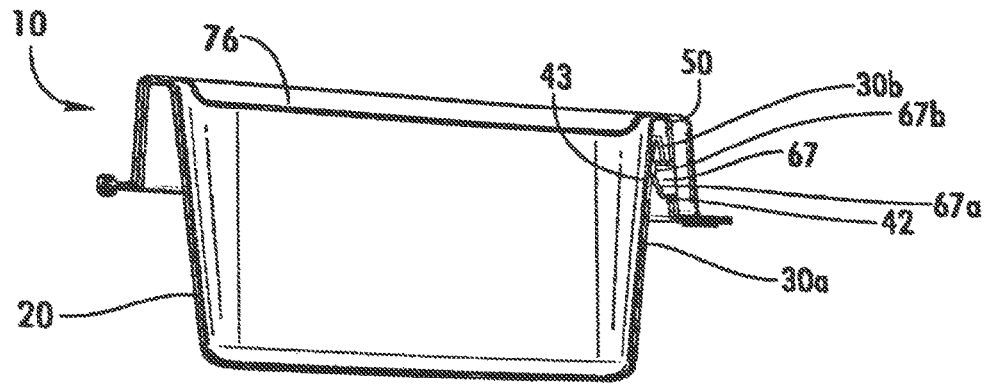
FIG. 1C is an end view of the packaging container in a closed configuration.

In the embodiments shown in FIG. 1A-1C, a packaging container 10 is formed from a sheet of thermoplastic material, such as polyvinyl chloride (PVC), Polyethylene, Impact Modified Polystyrene, Acrylic, Acrylonitrile Butadiene Styrene (ABS), Polycarbonate or any plastic otherwise suitable for thermoforming. Any desired thickness of plastic that is compatible with the plastic and the thermoforming process/machine being employed may be used. Without limiting the foregoing statement, generally the plastic may have a thickness of between about 0.010 inches and about 0.125 inches, or of from about 0.015 inches to about 0.090 inches, or of from about 0.15 inches to about 0.60 inches. Packaging container 10 may include a base section 20 having a chamber 25 defined by a bottom surface 26, an inner wall segment 30a, and an outer wall segment 30b adjoined by a base rim 30c. Packaging container 20 also includes a cover section 50 pivotally coupled to base section 20 at a hinge portion 52.

In order to facilitate a secure closure of packaging container 20, outer wall segment 30b includes at least one depression 40 formed therein. At least one outer aperture 42 is formed within depression 40 for engaging an inwardly protruding section and projection formed on a cover section 50, as will be discussed in detail below. At least one inner aperture 43, which aligns with outer aperture 42, may also be formed within inner wall segment 30a. A plurality of apertures 42 and 43 and corresponding depressions 40 may be included in some embodiments. A laterally extending flange 45 extends outwardly from outer wall segment 30b as show in FIGS. 1A and 1B.

Cover section 50 is configured to pivot about hinge portion 52 between an open state and a closed state. In particular, cover section 50 includes a top surface 77, which may include a recessed face portion 76, surrounded by a perimeter wall 79. Perimeter wall 79 includes at least one inwardly protruding section 65 shaped to correspond with depression 40 formed within outer wall segment 30b of base section 20. In addition, a post 67 projects from inwardly protruding section 65. In one embodiment, post 67 includes a straight edge portion 67a and an angled edge portion 67b. Alternatively, the entire edge may be angled or straight. Post 67 is adapted to engage corresponding at least outer aperture 42 of base section 20, and may also engage inner aperture 43 if present. Further, a peripheral flange 70 extends laterally and outwardly from outer wall segment 79. Peripheral flange 70 extends from a perimeter of cover section 50 such that, when packaging container 10 is in a closed position, peripheral flange 70 abuts laterally extending flange 45 of base section 20. Peripheral flange 70 includes a cut out area 71 adjacent to inwardly protruding section 65, as will be discussed below. Cover section 50 may also include at least one protuberance (not shown) formed therein to assist in de-nesting the containers when stacked in an open state.

Packaging container 10 includes a closure and release mechanism which allows container 10 to be securely closed and easily opened. In particular, laterally extending flange 45 is deformable, such that when laterally extending flange 45 is depressed in a region adjacent to depression 40 and outer wall segment 30b is simultaneously pushed inward, post 67 is released from apertures 43 and 42, thereby opening packaging container 10. Laterally extending flange 45, though deformable, is sufficiently resistant to deformation to return to its non-depressed shape when it is no longer depressed. Peripheral flange 70 includes a cut out area 71 at inwardly protruding section 65 of perimeter wall 79, such as to provide unobstructed access for depressing laterally extending flange 45 adjacent to depression 40 of base section 20 for opening packaging container 10.

In general, the closure and release mechanism 110 is made up of at least one inner aperture 43 formed within inner wall segment 30a of base section 20 and at least one outer aperture 42 formed within outer wall segment 30b of base section 20 aligned with at least one inner aperture 43. The closure and release mechanism also includes at least one projection 67 extending inwardly from the side wall portion 79 of the cover section 50 for engaging at least outer aperture 42 of the base section 20. The closure and release mechanism retains the cover section 50 over the base section 20 and secures the packaging container 10 in a closed position. The at least one projection 67 is released from the outer aperture 42 by depressing the deformable flange 45 and applying inward force to the outer wall segment 30b of the base section 20, thereby disengaging projection 67 from outer aperture 42 and (if present) inner aperture 43, opening the packaging container 10. In general, the posts and apertures engage to form a locking feature that uses the shear strength of the post engaged against the wall of material through which the aperture is formed. The force required to separate the posts from the aperture is a function of the shear strength of the formed post, and/or the shear strength of the punched hole.

The packaging container 10 is formed from a preheated sheet of thermoplastic material that is drawn into, or over, a mold to create the desired shape of the final product. After the material has reached a stable set point, such that it is rigid enough to be removed from the mold without losing the molded shape, the sheet is withdrawn in the opposite direction from which it entered the mold. Typically, the sheet enters the mold and is removed from the mold in a vertical fashion. Posts 67 are formed with retractable features within the mold, such as a round post or pin. When the heated plastic sheet is drawn into the mold, the post or pin is in an extended position. The plastic forms around the post or pin, adopting its shape. The post or pin is then retracted until the face of the post is at least flush with the sidewall of the mold. Thus, the post or pin is out of the way such that the plastic product can be removed from the mold. Mechanical linkages and other drive mechanisms may be used. Alternately, magnetics, pneumatic cylinders or the like may be employed. The timing of the projection of the feature outbound from the sidewall of the mold may be fine-tuned by being in the fully extended position prior to the heated material entering the mold and being activated just after the material has entered the mold, but prior to the material cooling beyond the point where it will be able to form around the feature.

Apertures 42 and 43 are formed within vertical or nearly vertical surfaces of outer wall segment 30b and inner wall segment 30a of wall 30 adjoined by a top ledge 30c. A punch and die mechanism is utilized to form apertures 42 and 43. The punch and die may mimic the profile of the formed post 67, but with a slightly larger profile to allow for clearance and ease of insertion of the formed posts 67 within apertures 42 and 43. The function of projections or posts 67 and cut-outs or apertures 42, 43 is to prevent the unintentional vertical opening of cover section 50 of packaging container 10. Thus, after the plastic has formed into the mold, the plastic is demolded and then the apertures are cut out. In high volume production the cutting of the hole feature may occur at a station between a forming station and a die cutting station. It is in the die cutting station that the planer surfaces of the plastic container are trimmed from the surrounding web of material so that the container can be removed from a leftover perimeter sheet.

In particular, the packaging container 10 is manufactured using a thermoforming process including heating, forming, punching, and trimming stages. The process according to the present disclosure begins with the heating stage. This stage comprises the thermoplastic sheet first going to a heating station, also called a heating tunnel, wherein at least one heating plate is installed to raise the temperature of the plastic sheet entering the heating station. The heating plate may include a plurality of heating elements disposed throughout the heating plate to maintain the heating plate at a relatively constant temperature throughout. The heating process makes it possible to take advantage of the thermoplastic behaviour of the material. The thermoplastic sheet initially may be rigid or unfavourable to stretching or molding, but can be softened by heating and thereby molded to form the container of the desired shape, size, and dimension in an easy, rapid, and precise manner. The plastic sheet is heated to the temperature such that it can be molded to any desired shape. In general, the heated processing temperature may vary depending on material to be molded, such as from about 200 degrees F. to about 1,200 degrees F., or from between 300 degrees F. to about 800 degrees F. For example, Polyvinyl chloride (PVC) typically has a typical forming temp of about 350 degrees F., with a range of workable temperatures. Other materials, such as PET, have a forming temperature of about 350 degrees F.

Figure 2A:
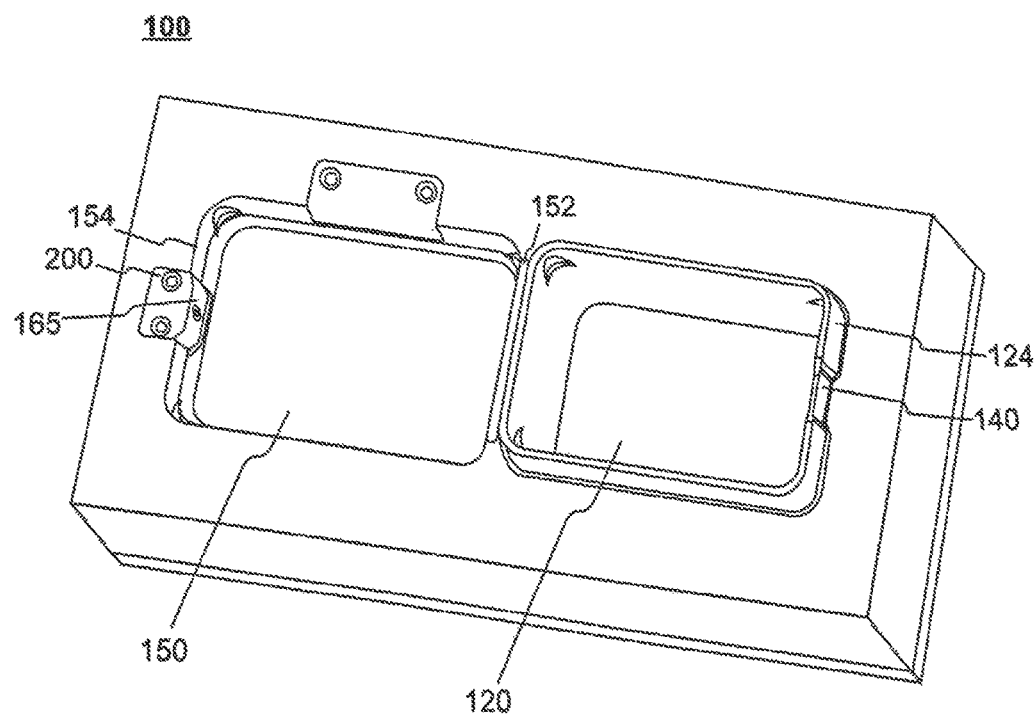
FIG. 2A is a perspective view of a mold according to an embodiment of the present disclosure.

After the heating process. the sheet then moves to a forming stage, comprising a mold 100, as illustrated in FIG. 2A. The mold can be created or selected to provide any shape, size, feature, and other characteristics of the desired container. The mold may be contained in a molding station or area that is separate from the heating station, but may be incorporated into an integral piece of equipment. However, one skilled in the art would understand that variations in the configuration of the heating and molding stations may exist without deviating from the scope of this disclosure. The mold 100 comprises a pre-formed shape of a base section 120, that includes at least one projection 140 on at least one side wall 124 of the base section 120 where an aperture is formed in further stages of the process; and, a pre-formed shape of a cover section 150, further including a side wall portion 179 having at least one outwardly protruding section 65 shaped to correspond with a depression formed by projection 140 within a peripheral wall of the base section. For the pivot connection of the base section and the cover section, a depression 152 for the hinge joint in the mold may be incorporated. The pre-heated thermoplastic sheet is drawn into, or over, the mold to create the desired shape of the packaging container. The plastic sheet is fed into the machine from one end and moves along the machine from one direction to another in one axis.

Figure 2B:
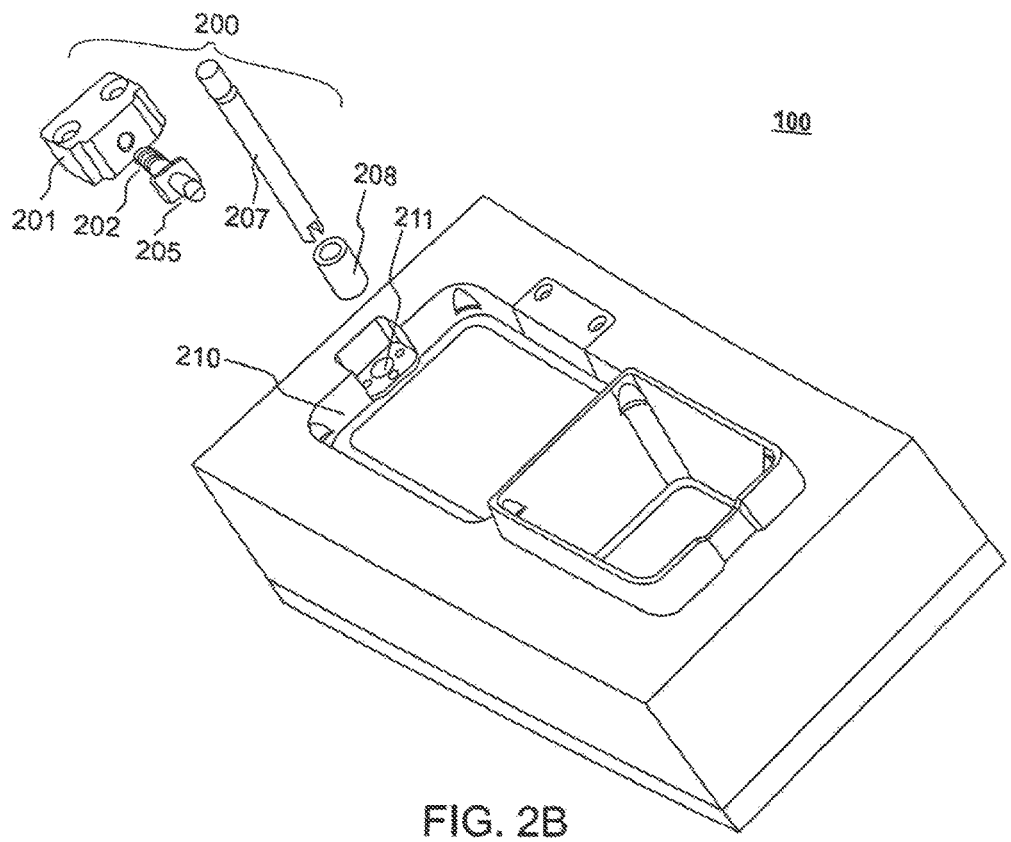
FIG. 2B is a perspective view of the mold according to an embodiment of the present disclosure, with an exploded view of the pin assembly.

Referring to FIG. 2B, the molding process of the thermoplastic sheet also comprise the steps of formation of the post. The mold 100 comprises a pin assembly 200, used to form a post 67 in the cover section of the container 10. The post 67 is a protrusion in a shape, which may be of, but not limited to, circular, semi-circular, star, square, rectangular, octagonal, or any other geometric shape, in the cover section 50 of the container 10. The shape and size of the post 67 formed by the pin 205 may vary according to the size and shape of the container 10.

In another embodiment of the present disclosure, the post 67 includes a bevel or an angled edge 67a and a top edge 67b as shown in FIG. 1C. The bevel in the post facilitates moving the post 67 along or past the side wall to the aperture. As shown in FIG. 2B, the pin assembly 200 comprises a fixture 210 to hold the container 10, a pin 205 shaped according to the desired shape of the post 67, a spring 202 to drive the pin 205, and a brass body 201 with one or more holes in the top (two are shown) to secure it in the mold 100, and one or more holes in the front (one is shown) to hold the spring 202 and the pin 205. The spring 202 and the pin 205 are driven by the cam 207 and bushing 208, that are placed into the mold 100 through a hole 211.

The fixture 210 holds the container shape within the peripheral cavity formed to cast the plastic in the required shape of the container. The timing of the projection of the pin 205 outbound from the sidewall of the mold may be fine-tuned by being in the fully extended position prior to the heated plastic sheet entering the mold and being activated just after the plastic sheet has entered the mold 100, but prior to the plastic cooling beyond the point where it will be able to form a post feature around the pin 205.

The pneumatic cylinder (not shown) is connected to the pin assembly 200, wherein the inlet of pressurized air compresses the spring 202 to move the pin 205 out of the pin assembly 200, in extended position so that the post 67 can be formed in the cover section 50 during the molding process. On the other hand, when the pressurized air is released from the pneumatic cylinder, the spring 202 returns back to the home position thereby retracting the pin 205 back into the pin assembly 200.

Further, the impact of the pin 205 on the plastic needs to be controlled for the optimal post formation. If the pin 205 moves too fast, the side walls of the post may tear or may develop holes in them. Also, the rapid movement of the pin may lead to formation of thin side walls of the post that might fail to provide the strength required for the closure mechanism to work properly and repeatedly. If the pin 205 moves too slowly, the plastic may cool down to a point where it will not deform readily upon impact by the pin 205, and thereby the features of the post 67 may not be well-defined.

The movement of the pin 205 is controlled by the volume of the pressurized air. The inlet and outlet for the air each have a valve that can be controlled and thereby adjust the amount of air passing through it. A pneumatic manifold (not shown) is used to route and control the flow of pressurized air to and from the pneumatic cylinder (not shown). The kinetic energy with which the pin 205 impacts the plastic to form the post 67 is controlled through a programmable logic controller (PLC) via the pneumatic cylinder.

After shaping the thermoplastic sheet in the mold, cooling is carried out to reach a stable set point, where upon the sheet is rigid enough to be removed from the mold without losing the shape of the mold from which it formed. Before removing the molded sheet from the mold, the pin 205 is retracted until the face of the pin 205 is at least flush with the sidewall of the mold. Thus, the extended pin is out of the way such that the molded plastic sheet can be removed from the mold. The retraction of the pin 205 is controlled by the pneumatic cylinder as described above.

Further, the molded sheet is withdrawn in the opposite direction from which it entered the mold. Typically, the sheet enters the mold and is removed from the mold in a vertical fashion. After removing the sheet from the forming station, it is fed into the punching stage.

Figure 3A:
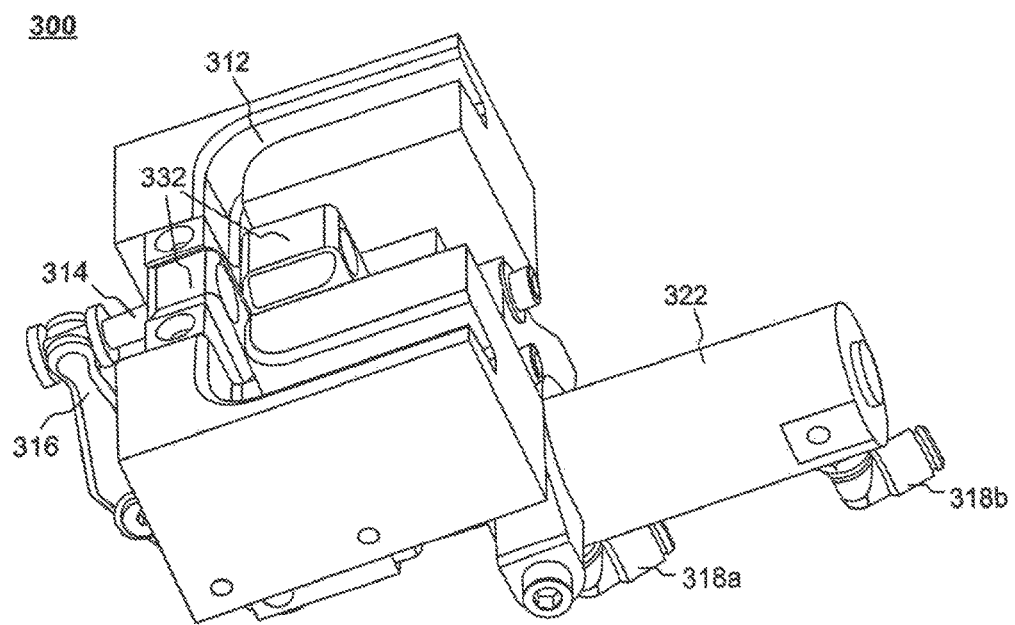
FIG. 3A is a perspective view of a punching station, according to an embodiment of the present disclosure.

Referring to FIG. 3A-3D, after molding the plastic sheet into the desired shape, the molded container reaches a punching stage. The punching process is used for forming aperture 42, which is a cut-out in the base section 20 of the packaging container 10, to receive the post 67 formed in cover section 50 of the container 10. The punching stage comprises a punching station 300 and a hold down plate (not shown). The hold-down plate is positioned opposite to the punching tool and helps to hold the containers in place during the punch process. The punching station 300 (as illustrated in FIG. 3A) comprises a fixture 312 to hold the container, a punch 314 which is used to create the aperture in the base section 20, a lever arm 316 to hold/move the punch 314, and air fittings 318a and 318b to let pressurized air into and out of the pneumatic cylinder 322 to drive the punch 314 with the help of the lever arm 316.

The punching station 300 moves up to engage the sheet of formed containers, along with the "hold-down" tool that descends from above the sheet to help hold the containers in place during the punch process. The hold-down plates may take the form of vertical bars which go in-between the container shapes, so as not to distort or crush them. The fixture 312 of the punching station 300 holds the shape of the container to carry forward the punch and die process. The pressurized air from the pneumatic cylinder 322 pushes the lever arm 316 to drive the punch 314 into the plastic container. The die 332 is fixed along the two side walls of the base section of the plastic container. After punching into the container, the punch 314 retracts back as the pressurized air comes out of the pneumatic cylinder 322. Release of air allows the lever arm 316 to move in the reverse direction, taking out the punch 314 from the die 332, followed by lowering down of the punching station 300.

FIG. 3D illustrates the die 332 fixed along the side walls of the base section 20. The 332a and 332b are the parts of the die placed adjacent to each side wall 30a and 30b of the base section 20. Die portion 332a and 332b are spaced apart in such a way that the impact of the punch may pierce or penetrate the double side walls of the base section to make aperture 42 and 43, as shown in FIG. 3B.

The movement of the punch 314 is controlled by the volume of the pressurized air flowing in and out of the pneumatic cylinder. The volume of air is measured as Cubic Feet per Minute, or CFM. Each of the air inlet and air outlets has air fitting valve 318a and 318b that can be controlled as a percentage of whether the valve is fully open or fully closed. For example, a valve may be opened to a value of 10 percent, meaning it is one-tenth of the way to being fully open. A pneumatic manifold (not shown) is used to route and control the flow of pressurized air to and from the pneumatic cylinder 322. The system of controlling the volume of pressurized air in the pneumatic cylinder 322 is operated to control the kinetic energy with which the punch 314 impacts the plastic to form the apertures 42 and 43, through a programmable logic controller, or PLC.

In other embodiments of the present disclosure, the mechanism to control the pin assembly for post formation and/or the punching stage for aperture formation may include, but is not limited to, hydraulic, electronic motor, servo motor, stepper motor, linear actuator, and piezoelectric actuator. The apertures 42 and 43 formed by the process described in the embodiments of the present disclosure may be partial cut-outs or complete holes of any geometric shape including, not limited to, circular, semi-circular, star, square, rectangular, octagonal, or any other shape compatible with the shape of the post formed in the cover section so as to enable the closure and release mechanism.

In another embodiment of the present disclosure, the clam shell locking arrangement on the container may be reversed. The post 67 may be present in the base section 20, formed to be inserted in the aperture 42 and 43 in the cover section of the container. In yet another embodiment of the present disclosure, the container 10 may contain one or more locking arrangements for a more secure closing mechanism during transportation, packaging, traveling, etc. There may be multiple post and aperture arrangements on the side walls of the container.

After the punching stage the container moves to the trimming stage. The trimming stage employs a die cutting station to trim off the unused portion of the plastic sheet, with the help of trimmers placed in the trimming station. Trimmers cut out the molded containers from the plastic sheet, which are pushed out to separate them from the remaining plastic sheet. The remaining plastic sheet or the web is further bound on a spool to be reground or, alternatively, either blended with the raw material for making new sheet or sold as scrap.

During the trimming stage laterally extending flange 45 and peripheral flange 70 are formed. Laterally extending flange 45 is deformable, such that when laterally extending flange 45 is depressed in a region adjacent to depression 40 and outer wall segment 30b is simultaneously pushed inward, post 67 is released from apertures 43 and 42, thereby opening packaging container 10. Laterally extending flange 45, though deformable, is sufficiently resistant to deformation to return to its non-depressed shape when it is no longer depressed. Peripheral flange 70 includes a cut out area 71, formed during trimming, at inwardly protruding section 65 of perimeter wall 79, such as to provide unobstructed access for depressing laterally extending flange 45 adjacent to depression 40 of base section 20 for opening packaging container 10.

In particular, peripheral flange 70 extends laterally and outwardly from outer wall segment 79. Peripheral flange 70 extends from a perimeter of cover section 50 such that, when packaging container 10 is in a closed position, peripheral flange 70 abuts laterally extending flange 45 of base section 20. Peripheral flange 70 includes a cut out area 71 adjacent to inwardly protruding section 65, as will be discussed below. Laterally extending flange 45 and/or peripheral flange 70 may be shaped and/or sized, either independently or relative to each other, to make the closure and release mechanism relatively easier or harder to open, such as to make packaging container 10 relatively hard for a child to open and/or relatively more resistant to accidental or unintentional opening, such as upon an impact. In one such approach, making laterally extending flange 45 relatively small, or the portion of laterally extending flange 45 that is readily accessible without obstruction by peripheral flange 70 relatively small, can make packaging container 10 it harder to open, while making it relatively large or less obstructed can make it easier to open.

In another embodiment of the present disclosure, each of flanges 45 and 70 of the packaging container 10 may have hanger openings 72a, 72b as shown in FIG. 1. The hanger opening 72a and 72b are formed during the trimming stage. Cut-outs for opening 72a and 72 b are formed in the flange 45 and 70 of the cover and base section such that packaging container 10 can be hung on and kept in a display rack used for storage or selling of items contained in packaging container 10, or on a pegboard, or any similar form of storage. The trimmed containers are further carried to the stacking stage, where the containers are manually or automatically stacked into piles of finished products.

Although the present disclosure has been described in terms of certain preferred embodiments, various features of separate embodiments can be combined to form additional embodiments not expressly described. Moreover, other embodiments apparent to those of ordinary skill in the art after reading this disclosure are also within the scope of this disclosure. Furthermore, not all of the features, aspects and advantages are necessarily required to practice the present disclosure. Thus, while the above detailed description has shown, described, and pointed out novel features of the disclosure as applied to various embodiments, it will be understood that various omissions, substitutions, and changes in the form and details of the apparatus or process illustrated may be made by those of ordinary skill in the technology without departing from the spirit of the disclosure. The disclosures may be embodied in other specific forms not explicitly described herein. The embodiments described above are to be considered in all respects as illustrative only and not restrictive in any manner. Thus, scope of the disclosure is indicated by the following claims rather than by the foregoing description.

We claim:

1. A method for thermoforming a packaging container having a base section and a cover section connected by a hinged portion, said packaging container having a closure and release mechanism including an inner aperture formed within an inner wall segment of a base section and an outer aperture formed within an outer wall segment of the base section aligned with the inner aperture, a projection extending inwardly from a side wall portion of the cover section for engaging at least the outer aperture of the base section, said closure and release mechanism retaining the cover section over the base section and securing the packaging container in a closed position and wherein the projection is released from the outer aperture by depressing a deformable flange and applying inward force to the outer wall segment of the base section, thereby opening the packaging container, said method comprising:
   A. heating a sheet of thermoplastic material to form a heated flexible sheet;
   B. transferring the heated flexible sheet to a mold having:
   a pre-formed shape of a base section having a bottom surface and spaced apart inner and outer wall segments, said outer wall segment having a depression formed therein,
   a pre-formed shape of a cover section having a top surface and a side wall portion with an inwardly protruding section formed therein, and
   a channel positioned between the base section and the cover section for forming a hinge joint of the packaging container;
   C. forming a projection in the cover section of the packaging container by
   actuating a pin assembly including a spring and a pin, wherein an inlet of pressurized air compresses the spring to move the pin out of the pin assembly to an extended position into the heated flexible sheet to form the projection in the heated flexible sheet and the release of pressurized air causes the spring to return and retract the pin into the pin assembly;
   cooling the heated flexible sheet to form a cooled shaped sheet that is rigid enough to be removed from the mold without losing the shape of the mold;
   retracting the pin into the pin assembly and removing the cooled shaped sheet from the mold; and
   D. positioning the cooled shaped sheet to a punching station and actuating a lever arm to drive to punch the inner and outer apertures in the inner and outer wall segments of the base section.

2. The method of claim 1 wherein said at least one outer aperture is formed within the at least one depression.

3. The method of claim 2 wherein the inwardly protruding section formed in the side wall portion of the cover section is shaped to correspond with said at least one depression.

4. The method of claim 3 further comprising forming a peripheral flange extending laterally from the side wall portion of the cover section, said peripheral flange adapted to contact said laterally extending flange of said base section when the packaging container is in a closed position, said peripheral flange having a cut out section at the inwardly protruding section of the peripheral wall, such as to provide unobstructed access for depressing the deformable flange of the base section for opening the packaging container.

5. The method of claim 1 wherein the at least one projection formed in the cover section is a post having an angled edge for facilitating the closure of the packaging container.

6. The method of claim 1 further comprising forming a recessed face in the top surface of the cover section forming a receiving area for retaining a bottom wall of the base section of a second packaging container, thereby allowing the packaging containers to be stacked.

7. In a method for thermoforming a packaging container having a base section and a cover section connected by a hinged portion, said packaging container having a closure and release mechanism including an inner aperture formed within an inner wall segment of a base section and an outer aperture formed within an outer wall segment of the base section aligned with the inner aperture, a projection extending inwardly from a side wall portion of the cover section for engaging at least the outer aperture of the base section, said closure and release mechanism retaining the cover section over the base section and securing the packaging container in a closed position and wherein the projection is released from the outer aperture by depressing a deformable flange and applying inward force to the outer wall segment of the base section, thereby opening the packaging container, a method of forming said closure and release mechanism comprising:
   forming a projection in the cover section of the packaging container by actuating a pin assembly including a spring and a pin, wherein an inlet of pressurized air compresses the spring to move the pin out of the pin assembly to an extended position into a heated flexible sheet to form the projection in the heated flexible sheet and the release of pressurized air causes the spring to return and retract the pin into the pin assembly;

cooling the heated flexible sheet to form a cooled shaped sheet that is rigid enough to be removed from the mold without losing the shape of the mold;

retracting the pin into the pin assembly and removing the cooled shaped sheet from the mold; and positioning the cooled shaped sheet to a punching station and actuating a lever arm to drive to punch the inner and outer apertures in the inner and outer wall segments of the base section.

8. The method of claim 7 wherein the at least one projection formed in the cover section is a post having an angled edge for facilitating the closure of the packaging container.

\* \* \* \* \*